Figure 1:
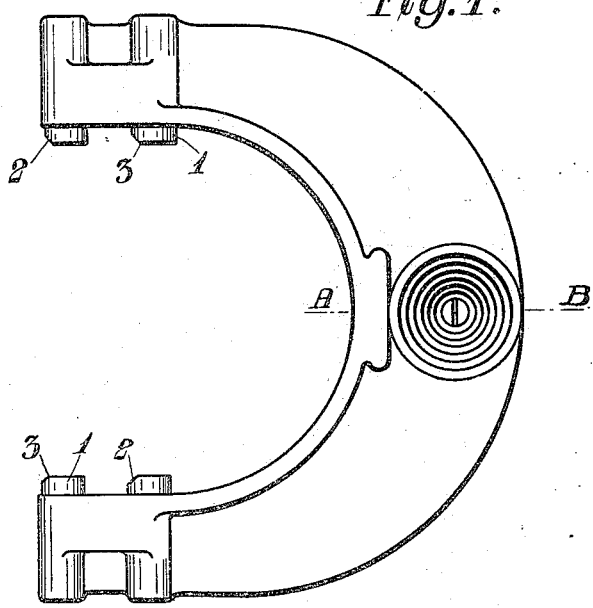

C. E. JOHANSSON.
SNAP GAGE AND THE LIKE.
APPLICATION FILED DEC. 11, 1914.

1,262,204.

Patented Apr. 9, 1918.

Witnesses:

Inventor:
Carl Edvard Johansson.

UNITED STATES PATENT OFFICE.

CARL EDVARD JOHANSSON, OF ESKILSTUNA, SWEDEN, ASSIGNOR TO AKTIEBOLAGET C. E. JOHANSSON, OF ESKILSTUNA, SWEDEN, A MANUFACTURING COMPANY REGISTERED UNDER THE LAWS OF SWEDEN.

SNAP-GAGE AND THE LIKE.

1,262,204.      Specification of Letters Patent.      Patented Apr. 9, 1918.

Application filed December 11, 1914. Serial No. 876,614.

*To all whom it may concern:*

Be it known that I, CARL EDVARD JOHANSSON, a subject of the King of Sweden, residing at Eskilstuna, in the Kingdom of Sweden, have invented new and useful Improvements in Snap-Gages and the like, of which the following is a specification, reference being had to the drawing accompanying and forming a part hereof.

When using solid or adjustable snap gages provided with round measuring studs only a very small portion of the head of the stud will at first touch the work-piece. Owing to rapid wearing this will cause a wedging effect and thus inaccuracies in the work when the snap gage is used by inexperienced workmen. Square heads on the measuring studs will to a certain extent protect against the appearing of the inaccuracies alluded to, but on the other hand they possess the disadvantage that the sharp corners will easily damage a work-piece of a soft material if the snap gage is run on more or less in an angle.

These disadvantages are provided against by the device forming the object of my present invention, which is broadly characterized by that in a snap gage cylindrical measuring studs are provided with a face on the edge that will first come into contact with a work-piece.

Figure 2:
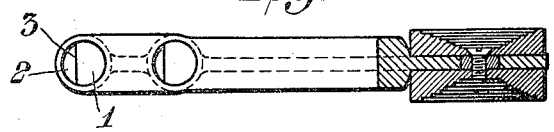
Figure 3:
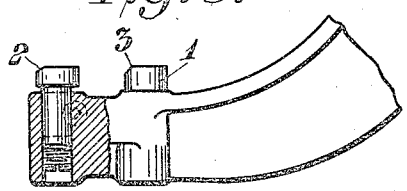

An embodiment of my invention is illustrated in the accompanying drawing, in which Figure 1 shows the snap gage from one side, and Fig. 2 shows a section on line A—B of Fig. 1. Fig. 3 shows a detail, partly in section.

The snap gage which may be solid or adjustable is provided with round measuring studs 1, each of which is provided with a face 2 cut at that edge of the cylindrical stud which first comes into contact with the work-piece. The face 2 may be either plane or rounded.

The advantage is hereby attained that when measuring, a long measuring edge 3 forming the base of the segmental face 2 will touch the work-piece in the same manner as when measuring with square-headed studs, the work-piece being, however, less exposed to damage, because the corners of the stud are not so sharp as the edges and corners of a square-headed stud. Owing to the facing of the measuring surface and to the cylindrical shape of the head of the stud the snap gage may also be more readily used in an angle to the longitudinal direction of a cylindrical work-piece without damaging the surface of the same. In addition, the portion of the measuring surface nearest to the edge 3 increases in breadth toward the center of the stud and is, therefore, less exposed to rapid wearing.

My invention is, of course, not limited to the embodiment above described and illustrated in the drawing, but should be understood to comprise such forms of faces that will serve the purpose set forth. For instance the face 2 instead of being plane may be slightly convex so that the edge 3 will be curved instead of straight.

I claim:

In a snap gage, cylindrical measuring studs in axial alinement each measuring stud being provided at the side first touching the work-piece to be measured with a substantially plane face forming a straight edge on the plane end surface of the stud, so that the measuring surfaces will first come into contact with the work-piece along the said straight edges, substantially as described.

CARL EDVARD JOHANSSON.

Witnesses:
  FREDRIK SCHMITAELOW,
  THURE OSTERLING.

Copies of this patent may be obtained for five cents each, by addressing the "Commissioner of Patents, Washington, D. C."